United States Patent
Alva

(10) Patent No.: US 12,413,164 B2
(45) Date of Patent: Sep. 9, 2025

(54) METHOD FOR OPERATING AN ELECTRIC MACHINE, DEVICE, ELECTRIC MACHINE, AND MOTOR VEHICLE

(71) Applicant: Robert Bosch GmbH, Stuttgart (DE)

(72) Inventor: Erick Falcon Alva, Bad Staffelstein (DE)

(73) Assignee: Robert Bosch GmbH, Stuttgart (DE)

( * ) Notice: Subject to any disclaimer, the term of this patent is extended or adjusted under 35 U.S.C. 154(b) by 199 days.

(21) Appl. No.: 18/254,719

(22) PCT Filed: Nov. 5, 2021

(86) PCT No.: PCT/EP2021/080723
§ 371 (c)(1),
(2) Date: May 26, 2023

(87) PCT Pub. No.: WO2022/117277
PCT Pub. Date: Jun. 9, 2022

(65) Prior Publication Data
US 2024/0007034 A1    Jan. 4, 2024

(30) Foreign Application Priority Data
Dec. 4, 2020   (DE) ...................... 10 2020 215 352.3

(51) Int. Cl.
*H02P 21/16*    (2016.01)
*B60L 15/20*    (2006.01)

(52) U.S. Cl.
CPC .............. *H02P 21/16* (2016.02); *B60L 15/20* (2013.01); *B60L 2240/421* (2013.01); *B60L 2240/425* (2013.01)

(58) Field of Classification Search
CPC .... H02P 21/16; B60L 15/20; B60L 2240/421; B60L 2240/425
(Continued)

(56) References Cited

U.S. PATENT DOCUMENTS

2017/0036671 A1* 2/2017 Fukuchi .................. B60L 50/61
2017/0282751 A1* 10/2017 Fukuchi .................. B60L 50/61

FOREIGN PATENT DOCUMENTS

| DE | 102014109677 A1 | 1/2015 |
| JP | 2010226914 A | 10/2010 |
| WO | 2019096497 A1 | 5/2019 |

OTHER PUBLICATIONS

Schulz (DE 102014109677 A) Method and Device for Monitoring an Electrical Permanent Magnetic Machine (Year: 2015).*

(Continued)

*Primary Examiner* — Jorge L Carrasquillo
(74) *Attorney, Agent, or Firm* — Michael Best & Friedrich LLP

(57) ABSTRACT

The invention relates to a method for operating an electric machine (9) comprising a rotatably mounted rotor (10) and at least one motor winding (13). In said method, a temperature load of the machine (9) is ascertained, and an electric motor current is applied to the motor winding (13) to generate a specified desired torque ($N_{desired}$) according to the temperature load. According to the invention, when a temperature load is ascertained that exceeds a specified load threshold, a field strengthening mode of the machine (9) is activated, in which field-strengthening mode the motor winding (13) is energized in such a way that the motor current has a positive field-forming current component (Id).

11 Claims, 2 Drawing Sheets

(58) Field of Classification Search
USPC .......................................................... 318/473
See application file for complete search history.

(56) References Cited

OTHER PUBLICATIONS

Translation of International Search Report for Application No. PCT/EP2021/080723 dated Feb. 11, 2022 (2 pages).
Gagas et al., "Magnet Temperature Effects on the Useful Properties of Variable Flux PM Synchronous Machines and a Mitigating Method for Magnetization Changes," IEEE Transactions on Industry Applications, 2017, vol. 53, No. 3, 10 pages.

* cited by examiner

METHOD FOR OPERATING AN ELECTRIC MACHINE, DEVICE, ELECTRIC MACHINE, AND MOTOR VEHICLE

BACKGROUND

The invention relates to a method for operating an electric machine comprising a rotatably mounted rotor and at least one motor winding, wherein a temperature load of the machine is ascertained, and wherein an electric motor current is applied to the motor winding to generate a specified desired torque according to the temperature load.

In addition, the invention relates to a device for operating an electrical machine having a control unit.

The invention also relates to an electric machine comprising such a device.

Further, the invention relates to a motor vehicle having such an electric machine.

An electric machine typically comprises a rotatably mounted rotor and at least one motor winding. In the operation of an electric machine, the motor winding is typically exposed to an electric motor current in order to generate a specified desired torque. The motor winding is thus energized or exposed to the motor current in such a way that a drive magnetic field is generated and the electric machine generates or provides the specified desired torque.

In operation, an electric machine heats up, wherein temperatures of greater than 230° C. can cause permanent magnets of a permanent magnet assembly of the electric machine to become demagnetized. An electric machine having at least partially demagnetized permanent magnets no longer provides the specified power or fails entirely when the permanent magnets are fully demagnetized. In order to protect the permanent magnets from demagnetization, it is known from the prior art to ascertain a temperature load of the electric machine and to take into account the temperature load when energizing the motor winding. For example, the publication WO 2019/096497 A1 discloses a method of operating an electric machine according to which the motor winding of the machine is energized at high temperatures in such a way that the magnetic stator flux of the machine is reduced compared to lower temperatures.

SUMMARY

The method according to the invention enjoys the advantage that the durability of the electric machine is increased. According to the invention, it is provided for this purpose that, when a temperature load is ascertained that exceeds a specified load threshold, a field strengthening mode of the machine is activated, wherein the motor winding in the field-strengthening mode is energized in such a way that the motor current has a positive field-forming current component (Id). The electric motor current flowing through the motor winding generally consists of a torque-forming current component (Iq) and a field-forming current component (Id). With respect to a rotor-fixed coordinate system, the field-forming current component flows parallel to the orientation of the magnetic field of the permanent magnet assembly. The torque-forming current component flows perpendicular to the orientation of the magnetic field of the permanent magnet assembly and corresponds to the torque generated by the machine. Depending on a working point of the machine, the torque-forming current component is positive, negative, or zero. The field-forming current component can also be generally positive, negative, or zero. According to the invention, the motor winding is energized when it is ascertained that the temperature load exceeds the load threshold in such a way that the motor current has a positive field-forming current component. Due to the positive field-forming current component, a field strengthening of the magnetic field of the permanent magnet assembly is achieved, from which the term "field-strengthening mode" is derived. Thus, due to the positive field-forming current component, a magnetic field is generated, which supports the correct alignment of micropoles of the permanent magnets of the permanent magnet assembly. In this respect, the positive field-forming current component prevents a demagnetization of the permanent magnet assembly of the machine or achieves a remagnetization of the permanent magnet assembly. Thus, a high temperature load of the electric machine is prevented from influencing the magnetization of the permanent magnets. This results in the increased durability of the electric machine achieved by the method according to the invention. Preferably, in the field-strengthening mode, a desired current vector for the motor current is specified, which has a positive field-forming current portion, wherein the motor winding is then energized according to the specified desired current vector in such a way that the motor current has the positive field-forming current portion. Preferably, the rotor comprises the permanent magnet assembly. The permanent magnets are then connected to the rotor in a rotationally fixed manner. In this case, the motor winding is configured as a stator winding and is arranged distributed around the rotor.

According to a preferred embodiment, it is provided that the motor winding is energized in the field-strengthening mode in such a way that the percentage share of the positive field-forming current portion of the motor current is at least 10%. This at least substantially prevents the demagnetization of the permanent magnets. Preferably, the proportion of the positive field-forming current component is at least 20%, particularly preferably at least 50%.

According to a preferred embodiment, the motor winding is energized in the field-strengthening mode in such a way that the positive field-forming current component is as large as possible. As a result, the advantages described above with regard to the prevention of the demagnetization or achievement of the remagnetization are provided to a particularly high degree. The greatest possible level of the positive field-forming current component is in particular limited in that the torque-forming current component must have a certain level in order for the electric machine to generate the specified desired torque. Thus, according to the specified desired torque, the motor winding is set to a working point of the electric machine in which the specified desired torque is generated and the positive field-forming current component is as large as possible.

According to a preferred embodiment, it is provided that, when a temperature load is ascertained that falls below the load threshold, the motor winding is energized in such a way that a torque-forming current component of at least substantially matches the motor current. The motor current is thus at least substantially free of a field-forming current component. As a result, an operation of the electric machine with particularly high efficiency is achieved. A positive field-forming current component is not necessary, because the load threshold is undershot.

Preferably, the temperature load of the rotor is ascertained as the temperature load of the machine. This is advantageous in that the rotor or the permanent magnet assembly of the rotor is the part of the electric machine that is to be protected against temperature-related damage. By ascertaining the temperature load of the rotor, a particularly precise decision can be made as to whether the positive field-forming current component is advantageous or necessary in order to prevent the demagnetization or to achieve the remagnetization or whether the positive field-forming current component currently does not provide any advantage due to the low temperature load. Preferably, a temperature of a stator of the electric machine is sensed by means of a temperature sensor, and the temperature of the rotor is ascertained on a model basis according to the sensed temperature of the stator.

Preferably, a temperature, in particular the temperature of the rotor, is ascertained as the temperature load. In this case, a threshold temperature is provided as the load threshold. For example, a temperature of between 210° C. and 250° C. is provided as the threshold temperature, particularly preferably a temperature of 230° C. Alternatively, a temperature integral of the temperature, in particular the temperature of the rotor, is preferably ascertained as the temperature load. In this case, a temperature integral threshold is then provided as the load threshold.

According to a preferred embodiment, it is contemplated that a threshold speed is specified for the rotor and that the field-strengthening mode is activated only in the presence of an actual speed of the rotor that falls below the threshold speed. As a result of such a procedure, it is prevented that an undesirably high electrical voltage is induced into the motor winding due to the rotation of the rotor at high actual speeds of the rotor exceeding the threshold speed.

According to a preferred embodiment, it is contemplated that a threshold torque is specified for the desired torque and that the field-strengthening mode is only activated in the presence of a desired torque that is below the threshold torque. If the desired torque exceeds the threshold torque, the provision of the positive field-forming current component could influence the ability of the electric machine to generate the desired torque to the specified level. This is undesirable.

The device according to the invention for operating an electric machine comprising a rotatably mounted rotor and at least one motor winding is characterized by a control unit specifically designed to perform the method according to the invention when used as intended. This, too, results in the aforementioned advantages.

The electric machine according to the invention comprises a rotatably mounted rotor and at least one motor winding. This, too, results in the aforementioned advantages. Preferably, the electric machine is configured as a permanent-magnet synchronous machine. In this respect, the electric machine comprises a permanent magnet assembly. The permanent magnet assembly is preferably part of the rotor and is connected in this respect to the rotor in a rotationally fixed manner.

BRIEF DESCRIPTION OF THE DRAWINGS

The invention will be explained in more detail in the following with reference to the drawings. The figures show.

DETAILED DESCRIPTION

Figure 1:
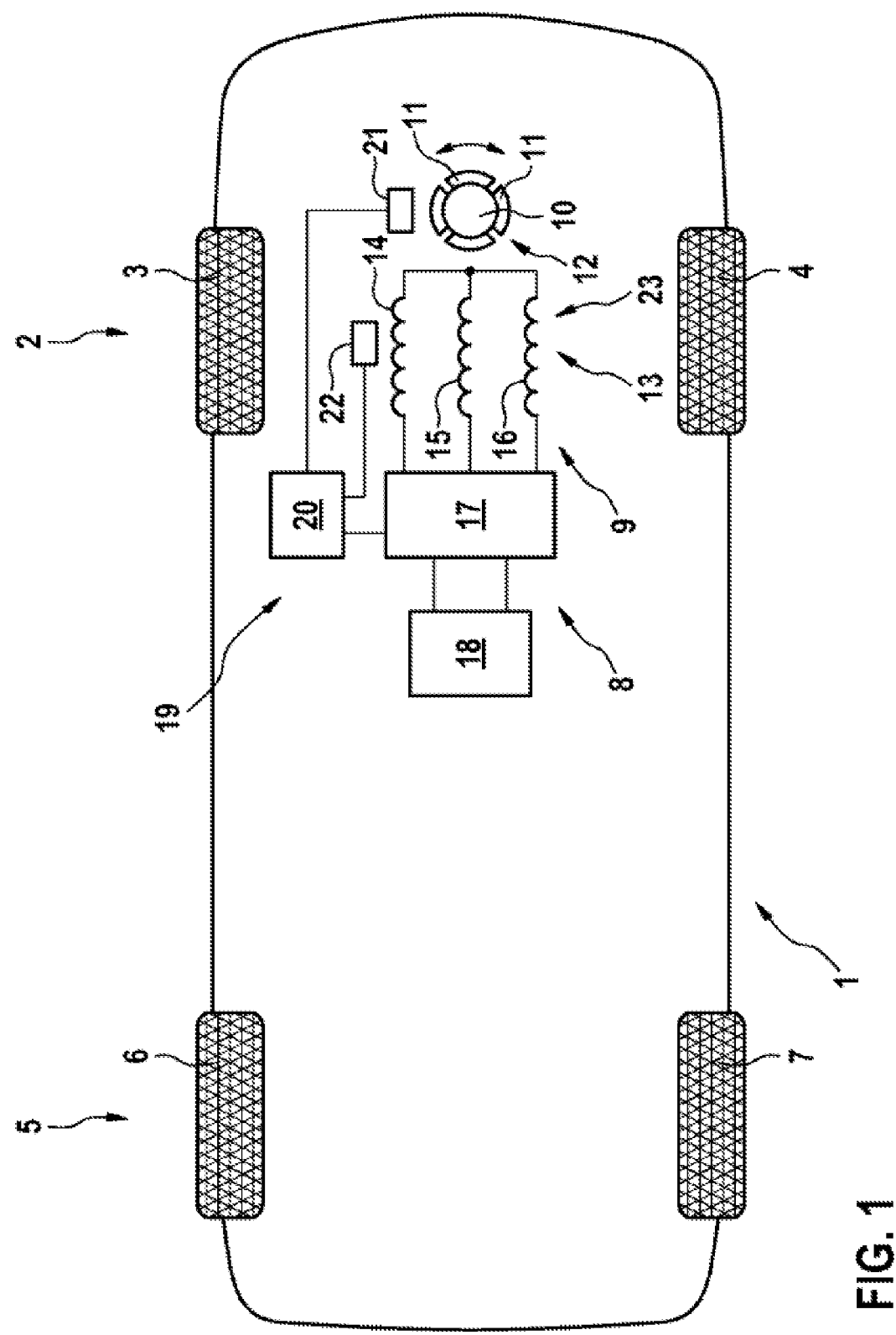
FIG. 1 a motor vehicle in a schematic view, and
FIG. 2 a method for operating an electric machine of the motor vehicle.

FIG. 1 shows a motor vehicle 1 in a schematic view. The motor vehicle 1 comprises a front wheel axle 2 with two front wheels 3 and 4 and a rear wheel axle 5 with two rear wheels 6 and 7.

The motor vehicle 1 also comprises a drive assembly 8 with an electric machine 9, which is configured so as to drive at least one of the wheels 3, 4, 6, and 7. For example, the machine 9 is configured so as to drive the front wheels 3 and 4, the rear wheels 6 and 7, or both the front wheels 3 and 4 and the rear wheels 6 and 7. Optionally, in addition to the machine 9, the drive assembly 8 comprises at least one further electric machine and/or at least one internal combustion engine.

The electric machine 9 comprises a rotor 10 that is rotatably supported in a housing of the machine 9, which is not shown. The rotor 10 comprises a permanent magnet assembly 12 having at least one permanent magnet 11. In the present case, several permanent magnets 11 are present. The permanent magnets 11 are fixedly connected to the rotor 10 and are arranged in a circumferential direction of the rotor 10. For example, permanent magnets 11 are neodymium-iron-boron magnets 11.

The machine 9 also comprises a motor winding 13. In the present case, the motor winding 13 is a stator winding 13 of a stator 23 of the electric machine 9. In the present case, the stator winding 13 comprises three phases 14, 15, and 16. The phases 14, 15, and 16 are arranged around the rotor 10 in such a way that the rotor 10 is rotatable by a suitable energization of the phases 14, 15, and 16. In addition to the stator winding 13, for example, the stator 23 comprises a carrier (not shown) for the stator winding 13.

The phases 14, 15, and 16 are electrically connected to an energy store 18 of the motor vehicle 1 by a power electronics 17 of the machine 9 comprising several switching elements.

The electric machine 9 also comprises a device 19 for operating the machine 9. The device 19 comprises a control unit 20, which is configured so as to drive or switch the switching elements of the power electronics 17.

The motor vehicle 1 also comprises a speed sensor 21 associated with the rotor 10. The speed sensor 21 is configured so as to sense the actual speed $N_{actual}$ of the rotor 10. The speed sensor 21 is communicatively connected to control unit 20 in order to provide the control unit 20 with its sensor signal, i.e. the sensed actual speed $N_{actual}$.

The motor vehicle 1 also comprises a temperature sensor 22. The temperature sensor 22 is associated with the stator 23 and is configured so as to sense the temperature of the stator 23. Temperature sensor 22 is communicatively connected to control unit 20 in order to provide the control unit 20 with its sensor signal, i.e. the sensed temperature.

Figure 2:
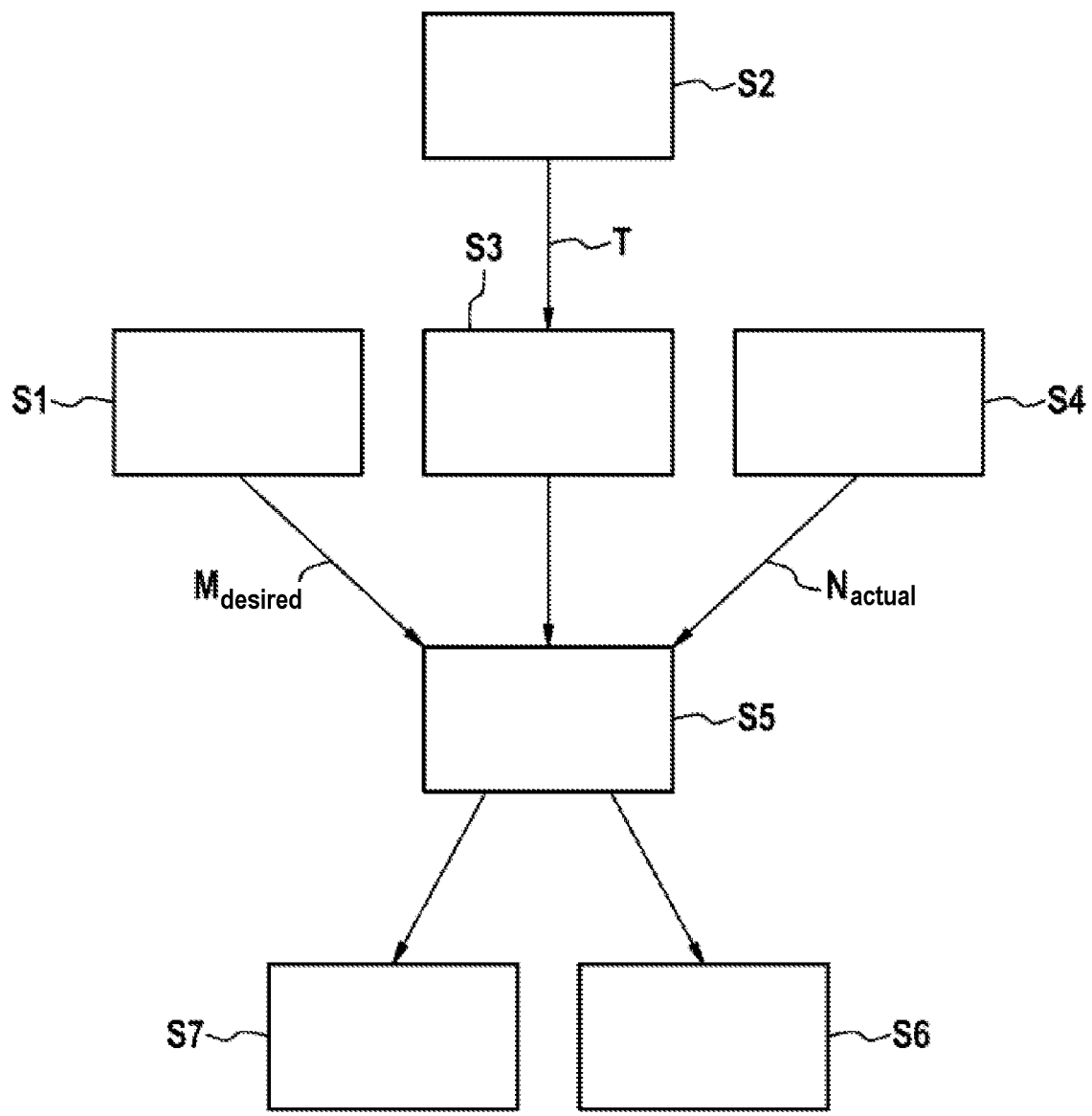

An advantageous method for operating the electric machine 9 by means of the control unit 20 is described in the following with reference to FIG. 2.

In a first step S1, the control unit 20 provides a desired torque $M_{desired}$ that is to be generated by the machine 9. For example, the control unit 20 ascertains the level of the specified desired torque $M_{desired}$ according to an activation of an accelerator pedal by a driver of the motor vehicle 1.

In a second step S2, the temperature sensor 21 senses the temperature of the stator 23 and provides the sensed temperature to the control unit 20.

In a third step S3, the control unit 20 ascertains a temperature load of the electric machine 9 according to the temperature sensed by the temperature sensor 22. In the present case, the control unit 20 ascertains the temperature of the rotor 10 as the temperature load of the electric machine 9. The control unit 20 ascertains the temperature of the rotor 10, preferably on a model basis, according to the sensed temperature of the stator 23.

In a fourth step S4, the speed sensor 21 senses the actual speed $N_{actual}$ of the rotor 10 and provides the sensed actual speed $N_{actual}$ to the control unit 20.

Steps S1, S2, S3, and S4 are carried out continuously so that the desired torque $M_{desired}$, the temperature load of the rotor 10, and the actual speed $N_{actual}$ of the rotor 10 are continuously ascertained or sensed.

In a fifth step S5, the control unit 20 decides whether to operate the electric machine 9 in a standard mode or in a field-strengthening mode, i.e. in a field-strengthening operation. In step S5, the control unit 20 takes into account the specified desired torque $M_{desired}$, the ascertained temperature load of the rotor 10, and the sensed actual speed $N_{actual}$ of the rotor 10. Step S5 is preferably also carried out continuously.

The control unit 20 provides a threshold load for the temperature load, a threshold speed for the actual speed $N_{actual}$, and a threshold torque for the desired torque $M_{desired}$. In the present case, the control unit 20 provides a threshold temperature as a threshold load, particularly preferably a threshold temperature of 230° C. In step S5, the control unit 20 then compares the desired torque $M_{desired}$ to the specified threshold torque, the ascertained temperature load to the specified threshold load, and the sensed actual speed $N_{actual}$ to the specified threshold speed.

If the comparison shows that the temperature load exceeds the threshold load, that the actual speed $N_{actual}$ falls below the threshold speed, and that the desired torque $M_{desired}$ falls below the threshold torque, then reference is made to a sixth step S6. In this step S6, the electric machine 9 is then operated in the field-strengthening mode. The control unit 20 then controls the switching elements of the power electronics 17 in such a way that an electric motor current flowing through the motor winding 13 has a torque-forming current component Iq and a positive field-forming current component Id. With the torque-forming current component Iq, it is achieved that the electric machine 9 generates the specified desired torque $M_{desired}$. With the positive field-forming current component Id, it is achieved that a magnetic field is generated that is aligned parallel to the magnetic field of the permanent magnets 11. This magnetic field prevents permanent magnets 11 from being demagnetized at a temperature load of the rotor 10 that exceeds the threshold load. In particular, it is achieved that portions of the permanent magnets 11 already demagnetized become remagnetized. In this respect, by operating the electric machine 9 in the field-strengthening mode, the durability of the permanent magnet assembly 12 and thus the durability of the electric machine 9 is increased.

If, however, the comparison in step S5 results in the desired torque $M_{desired}$ exceeding the threshold torque, the temperature load exceeding the threshold load, and/or the actual speed $N_{actual}$ exceeding the threshold speed, then reference is made to a seventh step S7. In the seventh step S7, the electric machine 9 is then operated in the standard mode. The control unit 20 then controls the switching elements of the power electronics 17 in such a way that the electric motor current flowing through the motor winding 13 is at least substantially formed by the torque-forming current component Iq. Thus, when operating the machine 9 in the standard mode, the motor current is at least substantially free of a positive or negative field-forming current component Id. In step S7, the motor winding is also energized in such a way that, due to the torque-forming current component Iq, it is achieved that the electric machine 9 generates the desired or specified desired torque $M_{desired}$.

The invention claimed is:

1. A method for operating an electric machine having a rotatably mounted rotor (10) and at least one motor winding (13), the method comprising:
   determining a temperature load of the machine (9), and
   applying an electric motor current to the motor winding (13) to generate a specified desired torque ($M_{desired}$) according to the temperature load, wherein when the temperature load exceeds a specified load threshold, a field strengthening mode of the machine (9) is activated, wherein the motor winding (13) in the field-strengthening mode is energized in such a way that the motor current has a positive field-forming current component (Id), and wherein when the temperature load falls below the load threshold, the motor winding (13) is energized in such a way that a torque-forming current component (Iq) of the motor current at least substantially matches the motor current.

2. The method according to claim 1, wherein the motor winding (13) is energized in the field-strengthening mode in such a way that the percent share of the positive field-forming current component (Id) in the motor current is at least 10%, preferably at least 20%, particularly preferably at least 50%.

3. The method according to claim 1, wherein the motor winding (13) is energized in the field-strengthening mode in such a way that the positive field-forming current component (Id) is the largest as possible percent share of the motor current allowing the machine (9) to generate the specified desired torque ($M_{desired}$).

4. The method according to claim 1, wherein the temperature load of the rotor (10) is ascertained as the temperature load of the machine (9).

5. The method according to claim 1, wherein a threshold speed is specified for the rotor (10), and that the field-strengthening mode is activated only in the presence of an actual speed ($N_{actual}$) of the rotor (10) that is below the threshold speed.

6. The method according to claim 1, wherein a threshold torque is specified for the desired torque ($M_{desired}$) and that the field-strengthening mode is only activated in the presence of a desired torque ($M_{desired}$) that is below the threshold torque.

7. The method according to claim 1, the method further comprising:
   determining an actual speed ($N_{actual}$) of the rotor (10) is below a threshold speed of the rotor (10),
   determining a desired torque ($M_{desired}$) is below a threshold torque for the desired torque ($M_{desired}$), and
   activating the field strengthening mode of the machine (9) in response to the temperature load exceeding the specified load threshold, the actual speed ($N_{actual}$) being below the threshold speed, and the desired torque ($M_{desired}$) being below the threshold torque.

8. The method according to claim 1, wherein the temperature load of the machine (9) is a temperature of the rotor (10) based on a temperature of a stator (23) of the machine (9).

9. A device for operating an electric machine, wherein the machine (9) comprises a rotatably mounted rotor (10) and at least one motor winding (13), wherein the device (19) comprises a control unit (20) configured to
   determine a temperature load of the machine (9), and
   apply an electric motor current to the motor winding (13) to generate a specified desired torque ($N_{desired}$) according to the temperature load, wherein when the temperature load is determined that exceeds a specified load threshold, a field strengthening mode of the machine (9) is activated, wherein the motor winding (13) in the field-strengthening mode is energized in such a way that the motor current has a positive field-forming current component (Id), wherein when the temperature load falls below the load threshold, the motor winding (13) is energized in such a way that a torque-forming current component (Iq) of the motor current at least substantially matches the motor current.

10. An electrical machine having a rotatably mounted rotor (10), at least one motor winding (13), and a device (19) according to claim 9.

11. A motor vehicle having an electric machine (9) according to claim 10.

* * * * *